Figure 1:
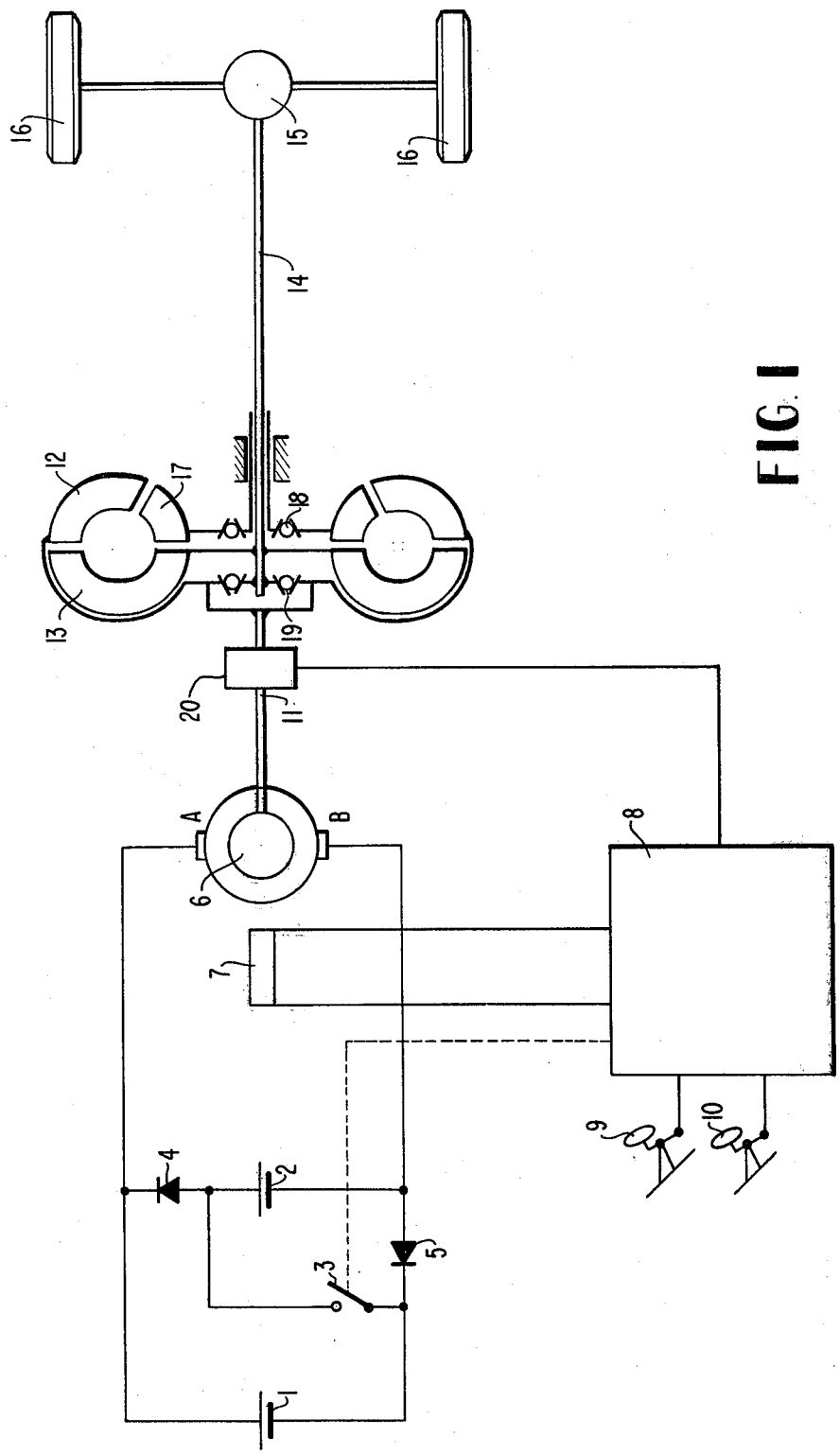

United States Patent

Bader

[11] 3,959,701
[45] May 25, 1976

[54] DRIVE SYSTEM FOR ELECTRICALLY DRIVEN VEHICLES

[75] Inventor: Christian Bader, Stuttgart, Germany

[73] Assignee: Firma Deutsche Automobilgesellschaft mbH, Hannover, Germany

[22] Filed: Aug. 1, 1973

[21] Appl. No.: 384,634

[30] Foreign Application Priority Data
Aug. 2, 1972  Germany............................ 2237963

[52] U.S. Cl................................. 318/139; 318/440
[51] Int. Cl.² .......................................... H02P 3/16
[58] Field of Search..................... 318/139, 138, 440; 322/4

[56] References Cited
UNITED STATES PATENTS

| | | | |
|---|---|---|---|
| 3,264,540 | 8/1966 | Dannettell | 318/139 |
| 3,512,072 | 5/1970 | Karazija et al. | 318/139 |
| 3,546,548 | 12/1970 | Wouk | 318/139 |
| 3,558,901 | 1/1971 | Jacobus | 322/4 |
| 3,675,112 | 7/1972 | Smith | 290/4 |
| 3,686,549 | 8/1972 | Winebrener | 318/139 |
| 3,728,599 | 4/1973 | Minami | 318/139 |
| 3,731,168 | 5/1973 | Strifler | 318/139 |

FOREIGN PATENTS OR APPLICATIONS

| | | |
|---|---|---|
| 534,124 | 12/1954 | Belgium |
| 874,996 | 6/1942 | France |
| 1,263,067 | 2/1972 | United Kingdom |

*Primary Examiner*—Robert K. Schaefer
*Assistant Examiner*—John W. Redman
*Attorney, Agent, or Firm*—Craig & Antonelli

[57] ABSTRACT

A drive system for electrically driven vehicles in which an electric motor is adapted to be driven from a driving battery which is adapted to be switched by means of a switch from partial voltage to full battery voltage; an electronic control system is provided which acts on the switch as well as on the excitation of the motor and is controlled by the motor rotational speed, by a driving pedal and by a brake pedal; the electric motor then drives a hydraulic torque converter which is interposed between the electric motor and the driven wheels.

23 Claims, 2 Drawing Figures

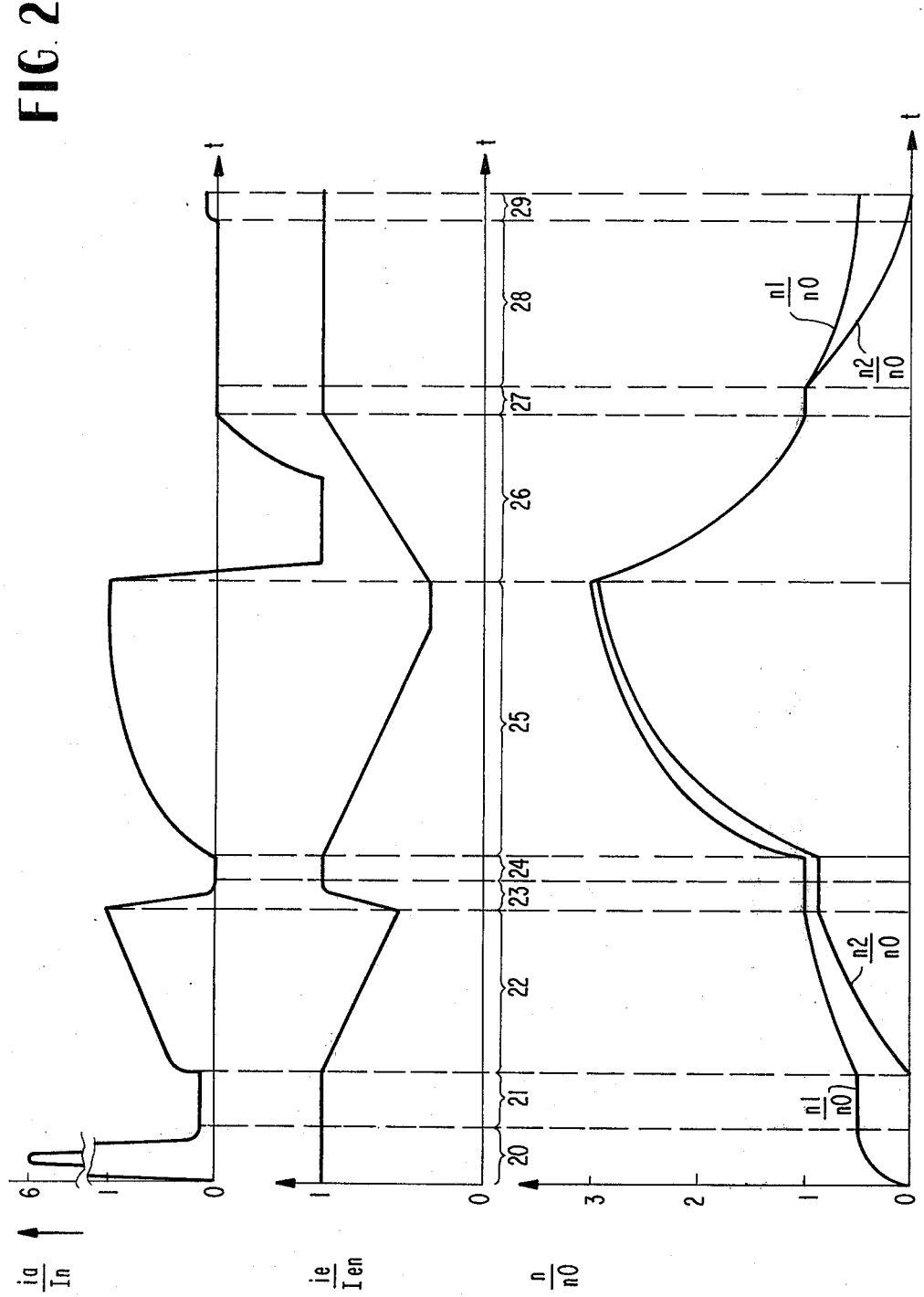

DRIVE SYSTEM FOR ELECTRICALLY DRIVEN VEHICLES

The present invention relates to a drive system for electric vehicles.

In the known drive systems for electro-vehicles, i.e., electrically driven vehicles, one always differentiates between two drive ranges by reason of the characteristics of the electric motors—whereby it is immaterial whether it involves D. C or A. C. motors. Starting from standstill up to a so-called type point, dependent on the voltage of the driving battery, which can be characterized by a certain associated velocity $v_T$, the voltage applied to the motor is so controlled that the magnetic main flux in the motor assumes essentially its rated value independently of the velocity, i.e., the terminal voltage is changed approximately proportionally to the rotational speed of the motor or to the vehicle velocity. To that end, according to known methods in the case of D. C. motor, the essentially constant battery voltage is so pulsed by a D. C. regulating unit, i.e., turned on and off in predetermined rhythm that a correspondingly lower average value of the voltage adjusts itself at the terminals or at the armature of the motor. Consequently, one designates this range as armature adjusting range. The voltage adaptation in the case of an A. C. motor take place in the same manner by a corresponding control and pulsed operation, for example, of the pulsed direct-current-alternating-current inverter.

Upon exceeding the velocity $v_T$, the full battery voltage is applied to the terminals of the electric motor or the amplitude of the A. C. voltage produced by the D. C./A. C. converter has reached the value of the battery voltage. The rotational speed of the electric motor can now be further increased only in that the magnetic main flux is reduced with respect to its rated value. Depending on the type of construction of the electric motor this field-weakening range extends up to rotational speeds which correspond approximately to the velocity $(3 \ldots 5) v_T$. This velocity thus represents also the maximum velocity attainable by the vehicle.

The armature adjusting range is now characterized, on the one hand, by a poorer efficiency than the field-weakening range because the full motor current has to be engaged and disengaged, i.e., turned on and off in rapid sequence (switching frequencies of several 100 Hz) in order to avoid disturbing instantaneous pulsations in the motor, whereby considerable engagement and disengagement losses arise in the semiconductor power switches or in the associated commutating devices. On the other hand, the semiconductor structure elements necessary therefor are quite expensive since they have to be designed for the full motor current and are thereby to exhibit good dynamic properties in order not to further worsening the over-all efficiency.

In contradistinction thereto, within the field-weakening range, the motor current is not interrupted at all in the case of a D. C. machine; for purposes of control, only the excitation current, which amounts to only a few per cent of the motor current, is turned on and off. In the case of an A. C. machine, a switching action is undertaken in the field-weakening range only as often as corresponds to the frequency of the A. C. machine; the control of the excitation itself takes place with the synchronous motor as with the D. C. motor; with the asynchronous motor it takes place without losses by a corresponding increase of the slippage frequency.

It is the aim of the present invention to provide a drive system which permits a starting without the necessary switching means of the arrangement used heretofore and which simultaneously supplies a higher torque and a better efficiency.

The underlying problems are solved according to the present invention by a drive system, consisting of the combination of an electric motor with a driving battery adapted to be switched from a partial voltage to the full battery voltage, with an electronic control system acting on the switch for the battery voltage and on the excitation of the motor and controlled at least by the motor rotational speed, a drive pedal and a brake pedal, and with a hydraulic torque converter.

A stepless transmission—the present invention prefers a transmission of the hydrodynamic type of construction—is coupled with the electric motor. Since with hydrodynamic torque converters, the power input is proportional approximately to the third power of the input rotational speed, the supply voltage of the motor is cut in half by the parallel connection of two halves of the driving battery during idling and at very low driving velocity in order to keep small the idling losses and to achieve a good efficiency during starting. For with the same rated flux, the rotational speed of the electric motor can be cut in half and the power input absorbed by the torque converter is reduced to one-eighth with half the rotational speed corresponding to the aforementioned relationship.

According to a further feature of the present invention in one embodiment in which the partial voltage corresponds to half the battery voltage, the driving battery consists of two halves with one diode each, which are so connected that the positive terminal of the first battery half is connected with the cathode of the second diode and with the terminal A of the motor, the negative terminal of the first battery half with the cathode of the first diode and the anode of the first diode with the negative terminal of the second battery half and with the terminal B of the motor and that the switch is connected between the negative terminal of the first battery half and the positive terminal of the second battery half.

In the starting range of the drive system according to the present invention, approximately comparable with the armature adjusting range of the prior art drive system, the electric motor is connected with the partial voltage of the battery and—beginning with the idling rotational speed with full excitation—is adapted to be driven for purposes of starting the vehicle by reducing the excitation up to reaching the rated rotational speed and the driving battery is adapted to be switched by the electronic control system upon reaching the rated rotational speed to full battery voltage and the electric motor simultaneously again to full excitation. The switching over to full excitation with increase of the battery voltage has as a consequence that a shock-free transition of the rotational speed between the two shifting positions results.

The further velocity increase is attained in that the electric motor is adapted to be driven within the driving range from the rated rotational speed up to maximum rotational speed in a conventional manner with full battery voltage by reducing the excitation of the field.

In order to obtain a favorable efficiency, provision is made that the guide wheel of the hydraulic torque converter includes in a conventional manner a freewheeling device so that the torque converter can operate at approximately identical driving and driven rotational speed as fluid coupling.

In order to be able to carry out also regenerative braking operations, provision is made according to the present invention that the hydraulic torque converter includes a further free-wheeling device between the output side and the input side which blocks a taking-over of the input by the output. The regenerative braking takes place in such a manner that upon actuation of the brake pedal, the excitation is so increased by the electronic control system that the electric motor, driven by the output shaft by way of the further free-wheeling device, runs in a known manner as generator and charges the series-connected battery halves.

In order to enable braking operations matched to the traffic, provision is made that the brake pedal is connected with a conventional mechanical brake which, upon further depressing the brake pedal, responds after reaching the full excitation.

The electronic control system is so constructed by conventional means that it switches the driving battery again to partial voltage after reaching again the full excitation when dropping below the rated rotational speed.

The slight worsening of the efficiency of the mechanical part of the drive system according to the present invention as a result of the torque converter losses is compensated for by the better electric efficiency since, on the one hand, the currents taken out of the battery are constant in time and need not be constantly turned off and on by pulsed operations as is the case with the proper art electric drive systems whereby the effective value of the battery current then is higher than its arithmetic average value and therewith also the losses in the battery and in the electric switching elements increase. Additionally, no switching elements which exhibit losses are necessary in the connection battery-electric-motor in the case of the D. C. motor with the exception of the starting range. On the other hand, the battery voltage can be selected lower than customary which in connection with galvanic energy sources is connected with an increase of the power in relation to the weight because the number of series-connected cells can be reduced. In the prior art electric drive systems, a voltage decrease is always connected with a worsening of the efficiency by reason of the switching elements (thyristors, inductances, etc.) connected in the connecting lines between the battery and the electric motor.

It is therefore even possible with the present invention to utilize a unipolar motor as driving motor, i.e., a collectorless D. C. motor of simple construction which, however, has only a very small terminal voltage (for the most part < 10 V). This is a great significance for modern galvanic energy sources (high temperature cells).

Finally, it should also be mentioned that already the price alone of a power thyristor which is required for such a prior art drive system lies considerably above that of a corresponding hydrodynamic torque converter so that the over-all costs of the drive system according to the present invention are considerably smaller than those of a comparable known electric drive system for a vehicle—whereby the price of the uncontrolled diodes 4 and 5 is of no importance, especially as they only have to be selected for half the rated motor current.

Accordingly, it is an object of the present invention to provide a drive system for electric vehicles which avoids by simple means the aforementioned shortcomings and drawbacks encountered in the prior art.

Another object of the present invention resides in a drive system for electrically driven vehicles which greatly simplifies the system and reduces the over-all costs thereof.

A further object of the present invention resides in a drive system for electric vehicles which minimizes the losses which occur during engagement and disengagement in the various circuits.

Still a further object of the present invention resides in a drive system for electrically driven vehicles which permits a starting of the vehicle without the switching means necessary heretofore while at the same time producing a higher torque and a better efficiency.

Another object of the present invention resides in a drive system of the type described above which not only produces a better efficiency but also permits regenerative braking as well as braking operations more properly matched to traffic conditions.

Still another object of the present invention resides in a drive system for electric vehicles driven by a battery in which the battery terminal can be kept lower, thus permitting an increase of power output to weight.

These and other objects, features and advantages of the present invention will become more apparent from the following description when taken in connection with the accompanying drawing which shows, for purposes of illustration only, one embodiment in accordance with the present invention, and wherein:

FIG. 1 is a schematic circuit diagram of one embodiment of a drive system in accordance with the present invention; and FIG. 2 is a diagram representing the curves of the characteristic magnitudes for an operating cycle of the drive system in accordance with the present invention.

Referring now to the drawing and more particularly to FIG. 1, one embodiment of the present invention is schematically illustrated in this figure. A separately excited D. C. machine is thereby illustrated as electric motor, however, the inventive concept is not limited to this type of motor but is equally applicable to all other types of motors, as indicated hereinabove. The two halves of the driving battery are designated by reference numerals 1 and 2, and it can be readily recognized from the circuit diagram of FIG. 1 that with an open switch 3, the two battery halves 1 and 2 are connected in parallel and are mutually uncoupld by the diodes 4 and 5 in order to preclude a mutual charging or discharging of the batteries with respect to each other. With a closed switch 3, the two battery halves 1 and 2 are series-connected and at the same time the current flow is blocked by the diodes. The energy source feeds the electric motor 6 with its excitation winding 7 which is supplied by the electronic control device 8 of conventional construction which may be constructed in a manner known to one of ordinary skill in the art depending on the positions of the drive pedal 9 or of the brake pedal 10. The influence of further measuring magnitudes such as rotational speed, current, and possibly temperature of the motor on the electronic control system, corresponds to known arrangements of the prior art and is therefore not indicated herein for purposes of simplification since it forms no part of the present invention. The electric motor 6 drives by way of its shaft 11 the pump wheel 12 of the hydrodynamic torque converter whose turbine 13 is connected with the vehicle wheels 16 by way of the output shaft 14 and the rear axle gear 15. The torque converter includes the guide wheel 17 necessary for the torque multiplication which is supported at the housing of the torque converter by way of a free-wheeling device 18. As a result thereof, the torque converter can operate as coupling with approximately identical input and output rotational speeds. The further free-wheeling device 19 brings about that the output rotational speed cannot become larger than the input rotational speed, i.e., during the braking of the vehicle or when driving over a downhill grade, when the electric motor operates as generator, the shaft 14 is coupled through with the motor shaft 11, and the entire mechanical brake power is directly fed to the electric motor.

The following operation now takes place. For purposes of starting, the electric motor 6 is connected with fully energized or fully excited field winding 7 and open switch 3 directly to half the battery voltage since the two battery halves 1 and 2 are connected in parallel. The current surge which occurs thereby for a short period of time is normally insignificant and in critical cases can be further reduced, for example, by starter impedances or the chokes which are series-connected with the diodes 4 and 5. The idling rotational speed of the motor which will establish itself is then equal to half its rated rotational speed. With a suitable dimension of the torque converter, it can be achieved that the idling losses occurring thereby are only insignificant; in one actual embodiment, these losses amounted to 6% of the rated power output of the electric motor. These losses, as to the rest, can be still further reduced by known methods (discontinuity places in the flow of the torque converter or installation of throttling disks) if this appears necessary. For purposes of starting, the excitation produced by the winding 7 is reduced whence the rotational speed of the motor shaft 11 increases and therewith also the torque transmitted by the torque converter. When the rotational speed of the electric motor 6 has exceeded twice the value of the idling rotational speed, the switch 3 is automatically closed by the electronic control system 8 in response to an output of a rotational speed detector 20 fed thereto and simultaneously the excitation current is doubled so that the excitation current again has the same value as during idling. It is assured thereby that the motor rotational speed before and after the switching over assumes the same value and therewith a disturbing shock is avoided during the closing of the switch 3. The electronic control device 8 can be so constructed by means well known in the control technique and therefore not described herein that an even temporary rotational speed increase is avoided during switching-over, even though the excitation current cannot change instantaneously by reason of the inductance of the field winding. After the switching over, the rotational speed and therewith the driving velocity of the vehicle can now be further increased in that the excitation of the field is reduced from its full value up to its permissive minimum value. In one actual embodiment, a ratio of the maximum torque during the starting to the minimum torque at maximum velocity of 1 : 5 is obtained thereby without overloading the electric motor. As tests with vehicles having internal combustion engines have demonstrated, this value enables satisfactory driving outputs.

During a braking, i.e., when mechanical energy is transmitted from the vehicle wheels to the motor, on the one hand, the free-wheeling device 19 becomes operable which then couples the shaft 14 with the motor shaft 11 and, on the other, by the actuation of the brake pedal 10, the excitation is so increased by the electronic control device 8 that the electric motor operates as generator and charges the series-connected battery halves 1 and 2. This regenerative braking is, however, possibly only up to the rated rotational speed which corresponds to twice the idling rotational speed of the electric motor since at lower rotational speeds the switch 3 opens and the then parallelly connected batteries can no longer be charged by reason of the diodes 4 and 5. This, however, does not entail in practice any disadvantage since only less than 10% of the maximum usable kinetic energy of the vehicle remains unused by reason of the low rotational speeds in the lower range and therebeyond the brake pedal 10, upon being more strongly depressed, actuates, in addition to the electric brake, also the mechanical vehicle brake.

The curves of the characteristic magnitudes are illustrated in FIG. 2 as a function of time which are each referred to the rated or nominal value thereof. During the starting (range 20) there results a short current peak in the armature current $i_a$ (approximately 0.1 seconds), the field being fully excited at that time and the batteries being connected in parallel (switch 3 opened). The idling rotational speed of the motor amounts to $n: n_0 = 0.5$ (range 21), $n_0$ = rated rotational speed of the motor; the output rotational speed $n_2$ of the torque converter is held to 0 by the mechanical brake. For purposes of starting (range 22) the excitation is decreased by conventional means; as a result thereof, a current can flow from the battery into the electric motor whereby the motor rotational speed $n_1$ increases and also the vehicle is accelerated by way of the torque converter. The vehicle velocity is proportional to the torque converter output rotational speed $n_2$. As soon as $n_1 : n_0 = 1$, the excitation is again increased to its starting value (range 23); this operation requires approximately 0.3 seconds by reason of the excitation time constant. As a result, thereof, the armature current becomes zero since during this short period of time, the vehicle velocity can not significantly change. The switch 3 can therefore be closed currentless (range 24) and the excitation can again be reduced starting from its rated value whereby a further acceleration of the vehicle is made possible (range 25). For purposes of regenerative braking, the excitation is so increased by the electronic control device 8, utilizing conventional means known as such in the art, that the motor current is able to reverse its direction and charges the batteries (range 26). The additional free-wheeling device in the torque converter thereby assures that during the regenerative braking the relationship $n_2 = n_1$ always exists. As soon as the point $n_1 : n_0 = 1$ is achieved, no regenerative braking can be attained any more also with full excitation; before the further braking, the switch 3 is opened currentless (range 27) and the vehicle is brought to standstill by means of the mechanical brake (range 28, 29). As a result of the torque converter, the motor rotational speed $n_1$ also decreases together with $n_2$ until the value $n_1 : n_0 = 0.5$ is reached. When dropping below this value, a current now starts to flow again from the now parallelly connected battery in order to maintain the idling rotational speed (range 29).

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A drive system for electric vehicles, characterized by an electric motor means having an excitation means, a driving battery means for supplying power to the electric motor means and adapted to be switched by a switch means from a partial voltage to the full battery voltage, a hydraulic torque converter means operatively connected with the electric motor means, and electronic control means operatively connected with the switch means and with the excitation means of the motor means, the electronic control means being controlled in response to at least one of the motor rotational speed, a driving control member and a brake control member.

2. A drive system according to claim 1, characterized in that the drive member and the brake member are a drive pedal and a brake pedal of a motor vehicle.

3. A drive system according to claim 2, characterized in that the driving battery means includes two sections with one diode each which are so connected that the plus terminal of one battery section is connected with the cathode of the second diode and with one terminal of the motor means, the negative terminal of the first battery section is connected with the cathode of the first diode and the anode of the first diode is operatively connected with the negative terminal of the second battery section and the other terminal of the motor means, and in that the switch means is operatively between the negative terminal of the first battery section and the positive terminal of the second battery section.

4. A drive system according to claim 3, characterized in that the driving battery means consists of two halves forming one section each.

5. A drive system according to claim 4, characterized in that the electric motor means is operatively connected to the partial voltage of the battery and—beginning at idling rotational speed with full excitation—is adapted to be driven for purposes of starting the vehicle by a reduction of the excitation up to substantially reaching the rated rotational speed and in that the driving battery means is adapted to be switched by the electronic control means to full battery voltage upon reaching the rated rotational speed and the motor means is adapted to be switched at the same time again to full excitation.

6. A drive system according to claim 5, characterized in that the electric motor means is adapted to be driven in the driving range from the rated rotational speed up to maximum rotational speed at full battery voltage by a reduction of the excitation.

7. A drive system according to claim 6, characterized in that the torque converter means includes a guide wheel having a free-wheeling means so that the torque converter means is able to operate as coupling at approximately the same input and output rotational speeds thereof.

8. A drive system according to claim 7, characterized in that the torque converter means includes a further free-wheeling means between the torque converter input and torque converter output which blocks the taking over of the input by the output.

9. A drive system according to claim 8, characterized in that upon actuation of the brake pedal, the excitation is so increased by the electronic control means that the motor means, driven by the output shaft of the torque converter means by way of the further free-wheeling means, operates as generator and charges the series-connected battery sections.

10. A drive system according to claim 9, characterized in that the brake pedal is connected with a mechanical brake means which responds upon further depressing the brake pedal after reaching full excitation.

11. A drive system according to claim 10, characterized in that the electronic control means is so constructed and operable that after again reaching the full excitation, the driving battery means is again switched over to partial voltage when dropping below the rated rotational speed.

12. A drive system according to claim 1, characterized in that the torque converter means includes a guide wheel having a free-wheeling means so that the torque converter means is able to operate as coupling at approximately the same input and output rotational speeds thereof.

13. A drive system according to claim 12, characterized in that the torque converter means includes a further free-wheeling means between the torque converter input and torque converter output which blocks the taking over of the input by the output.

14. A drive system according to claim 13, characterized in that upon actuation of the brake pedal, the excitation is so increased by the electronic control means that the motor means, driven by the output shaft of the torque converter means by way of the further free-wheeling means, operates as generator and charges the series-connected battery sections.

15. A drive system according to claim 14, characterized in that the brake pedal is connected with a mechanical brake means which responds upon further depressing the brake pedal after reaching full excitation.

16. A drive system according to claim 1, characterized in that the electric motor means is adapted to be driven in the driving range from the rated rotational speed up to maximum rotational speed at full battery voltage by a reduction of the excitation.

17. A drive system according to claim 16, characterized in that the electronic control means is so constructed and operable that after again reaching the full excitation, the driving means is again switched over to partial voltage when dropping below the rated rotational speed.

18. A drive system for electric vehicles, characterized by an electric motor means having excitation means, a driving battery means for supplying power to the electric motor means and adapted to be switched by a switch means from a partial voltage to the full battery voltage, a hydraulic torque converter means operatively connected with the electric motor means, and electronic control means operatively connected with the switch means and with the excitation means of the motor means, said electronic control means being responsive to at least one of the rotational speed of the electric motor means, a driving control member and a brake control member, said electric motor means being operatively connected to the partial voltage of the battery and—beginning at idling rotational speed with full excitation—being adapted to be driven for purposes of starting the vehicle by a reduction of the excitation up to substantially reaching the rated rotational speed, said electronic control means being responsive to the reaching of the rated rotational speed for controlling said switch means to switch the driving battery means to full battery voltage and for controlling the excitation means of said electric motor means to provide for full excitation at the same time, said hydraulic torque converter means including a free-wheeling means between the torque converter input and the torque converter output which blocks the taking over of the input by the output.

19. A drive system according to claim 18, characterized in that said electronic control means controls the excitation means of said motor means so as to reduce the excitation for driving said electric motor means in the driving range from rated rotational speed up to maximum rotational speed at full battery voltage.

20. A drive system according to claim 19, characterized in that said torque converter means includes a guide wheel having a further free-wheeling means for enabling said torque converter means to operate as a coupling at approximately the same input and output rotational speeds thereof.

21. A drive system according to claim 20, characterized in that said driving control member is a drive pedal and said brake control member is a brake pedal, said electronic control means being responsive to actuation of the brake pedal for increasing the excitation of said electric motor means so that said electric motor means, driven by the output shaft of said torque converter means by way of said free-wheeling means, operates as a generator and charges said driving battery means.

22. A drive system according to claim 21, characterized in that said brake pedal is connected with a mechanical brake means which responds upon further depressing the brake pedal after reaching full excitation.

23. A drive system according to claim 22, characterized in that said electronic control means is responsive to the dropping below of rated rotational speed after controlling the excitation means of said electric motor means to again reach full excitation for controlling said switch means of said driving battery means to switch said driving battery means to partial voltage.

* * * * *